United States Patent [19]

Giovanella

[11] Patent Number: 4,901,161

[45] Date of Patent: Feb. 13, 1990

[54] METHOD OF TRANSFER OF FILM TO VIDEO AND SYSTEM THEREFOR

[75] Inventor: Wilfred J. Giovanella, Weston, Canada

[73] Assignee: Tintoretto Inc., Toronto, Canada

[21] Appl. No.: 132,421

[22] Filed: Dec. 10, 1987

[30] Foreign Application Priority Data

Dec. 23, 1986 [CA] Canada ............................ 526209

[51] Int. Cl.$^4$ ............................................ H04N 5/76
[52] U.S. Cl. .................................. 358/346; 356/54; 356/214; 356/216
[58] Field of Search ................ 358/54, 214, 216, 345, 358/346

[56] References Cited

U.S. PATENT DOCUMENTS

| | | |
|---|---|---|
| 3,366,733 | 1/1968 | Frohbach . |
| 4,157,570 | 6/1979 | Atsumi . |
| 4,214,268 | 7/1980 | Keznickl ............................ 358/346 |
| 4,337,484 | 6/1982 | Broussaud et al. . |
| 4,633,293 | 12/1986 | Powers ............................ 358/214 X |

FOREIGN PATENT DOCUMENTS 953815 8/1974 Canada .
152141 8/1985 European Pat. Off. .

OTHER PUBLICATIONS

Abekas Protocol Manual Model A62 Digital Disk Recorder (undated).

Primary Examiner—Robert L. Richardson
Attorney, Agent, or Firm—Ivor M. Hughes

[57] ABSTRACT

An improved process for transferring film to video or film previously transferred to video for the treatment thereof and the transfer thereof to a master at a real time play rate, the process comprising the steps of: (a) transferring film to video or transferring video carrying the film previously transferred to it to video in a 1:1 frame of film to frame of video ratio where one frame of film, or one frame of film previously transferred to video as the case may be, corresponds to one frame (two sequential fields) of video—(thus each frame of film now occupies only two sequential fields of video).

8 Claims, 4 Drawing Sheets

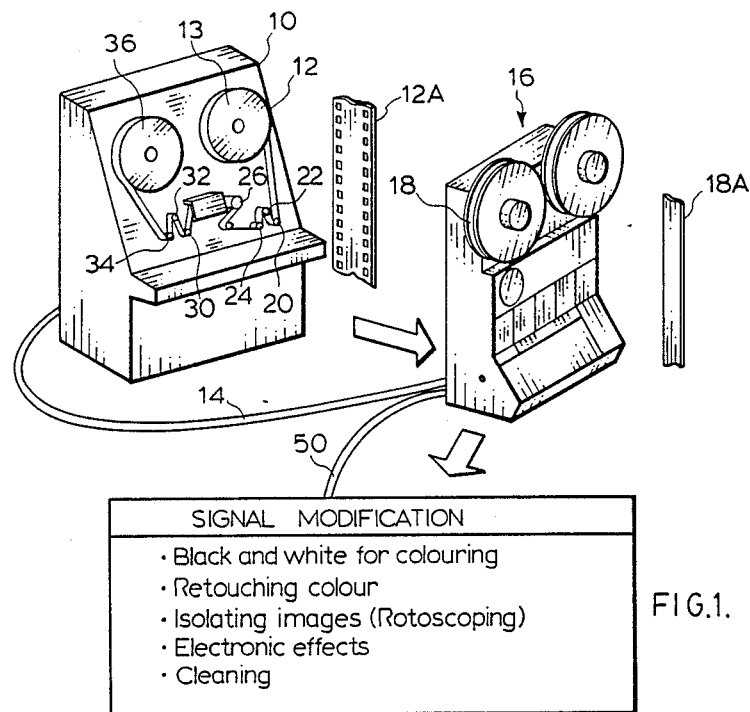
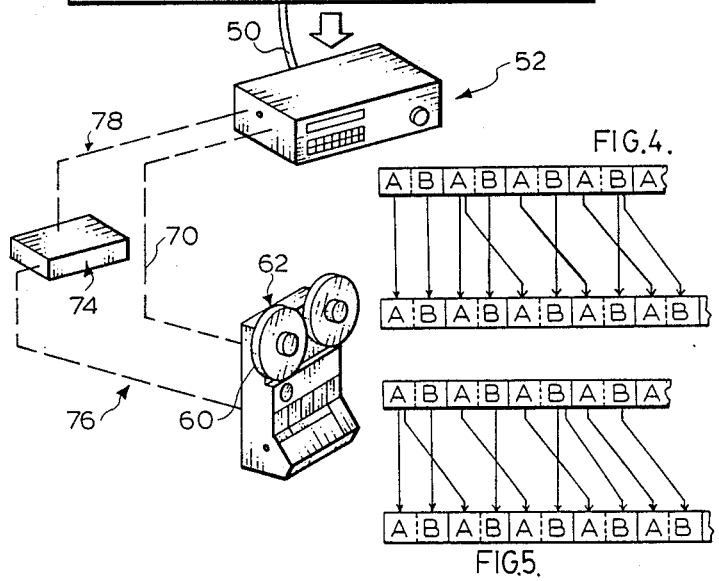

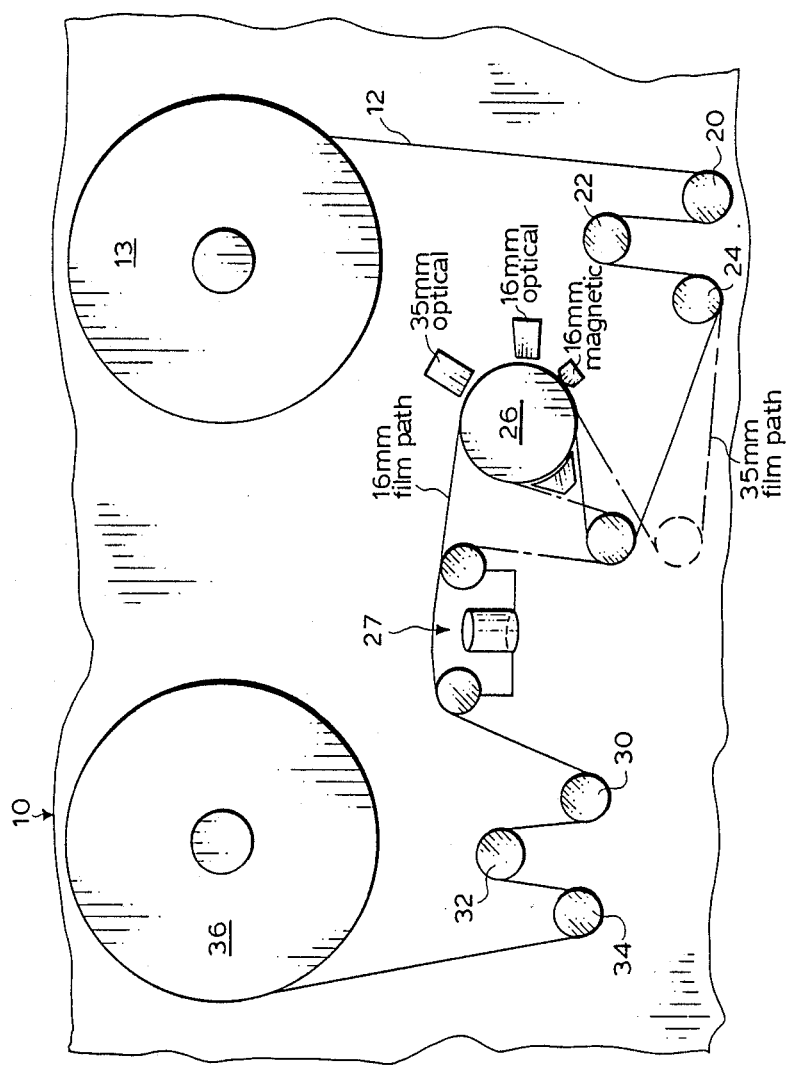

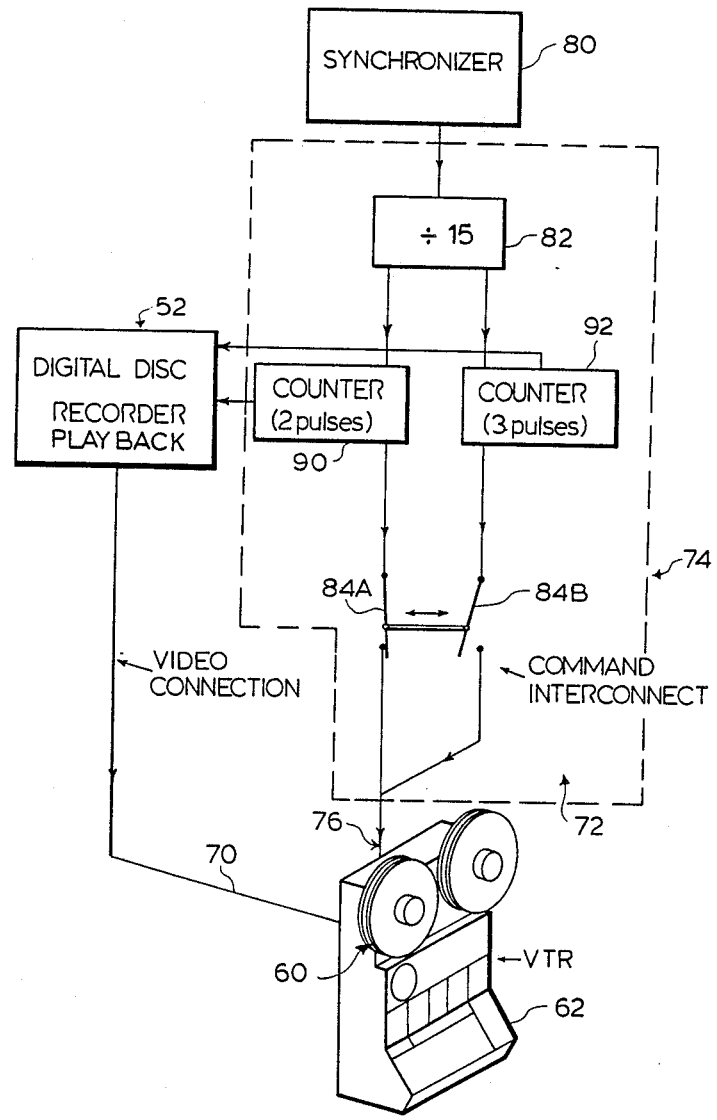

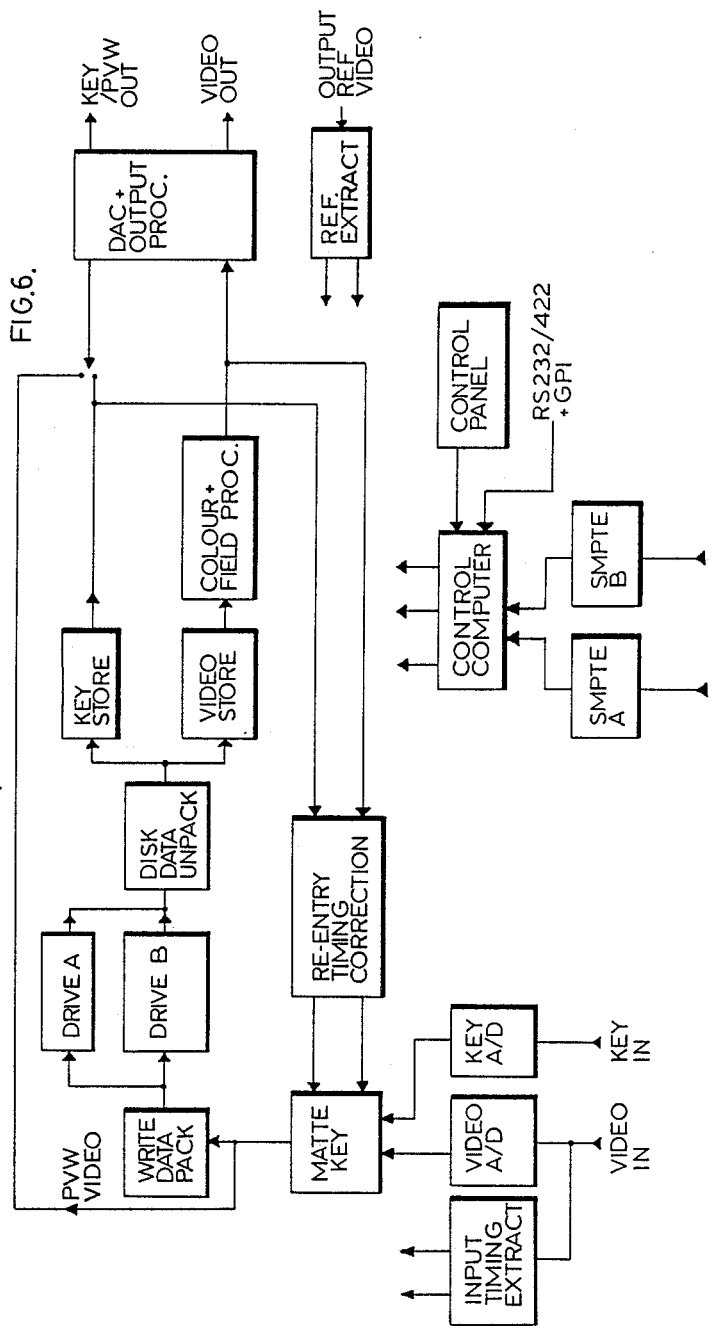

METHOD OF TRANSFER OF FILM TO VIDEO AND SYSTEM THEREFOR

FIELD OF INVENTION

This invention relates to the transfer of film to video and the transfer of film which has previously been transferred to video.

BACKGROUND OF INVENTION

In transferring the film into a video signal, the film (running at 24 frames/second), is usually transferred in "real time" to video (30 frames/second - 60 fields/second), for treatment (for example, automated electronic colouring, special electronic effects, electronic rotoscoping, electronic post productions). Thus each frame of film transferred is not transferred to one frame (two fields) of video. In fact, the transfer is what is known as "3:2 pull down" where the frames of film are deposited on three fields of video and the next frame of film onto two fields of video, the next frame of film into three fields of video and so on. The order may be reversed—two fields, then three fields, then two fields and so on. The result when played back is interfield motion within the same frame of video.

To retain and maintain frame integrity it has been proposed to transfer the film at a sped up rate of 30 frames per second to video. Each film frame now occupies one video frame thus simplifying treatment. Thereafter, it has been proposed that the rate of video playback be converted to twenty-four frames per second. This is purported to be accomplished using the "slomo" (slow motion) mode of the video machine, to convert its thirty frames per second recording of the film to an equivalent twenty-four frames per second speed. See the article entitled "Black and White in Colour" in *The BKSTS Journal*, Nov., 1983.

Other proposals have been made. In this regard, see:

U.S. Pat. No. 4,402,018 which purports to teach a process for converting images on a motion picture film into a video signal, said film being recorded in the form of twenty-four frames per second and said video signal being displayed at sixty fields per second, said process comprising: (A) repeating video signals derived from a (B) repeating video signals derived from each of the next three film frames two times in order to provide the next six video fields; whereby said four film frames produce a 4-2-2-2 conversion into video signals; (C) generating reference gating signals for identifying the beginnings and ends of each 4-2-2-2 conversion; (D) arranging each 4-2-2-2 conversion responsive to said reference signal to have a specific position relative to a vertical blanking period in said video signals; and (E) recording four fields on each turn of a spiral track on a recording disk which is rotating at 900 R.P.N;

U.S. Pat. No. 4,337,484 which purports to teach an apparatus in which the video disk frames are reread while a shutter blocks the film in order to have during the rereading operation, the time necessary for advancing the kinescope film without causing violent mechanical stresses. In order to pass from the television standard with thirty frames per second to the cinematographic standard of twenty-four frames per second, one frame out of five is not recorded on the film and the film advanced without any rereading;

European Application Pat. No. 152,141 purports to teach a record carrier having a spiral-shaped or concentric ring-shaped information track on which a programme is recorded in a sequence of two fields in every turn of the track. It requires (n) film frames per unit time to be reproduced in order to realize reproductions with the original frame speed. The nominal playback speed of the carrier is (m) video pictures of two fields per unit time, where (m) is greater than (n). The read apparatus can move the scanning point forwards or backwards in a radial direction over a distance corresponding to the radial displacement over one revolution using a jump-signal generator (13), switch (14) and motor (17);

For each film frame only two consecutive fields are recorded. During read-out the scanning point is moved backwards and/or forwards to preceding and following turns of the track. Each time consecutive film frames are reproduced the number of film frames reproduced per unit time is (n) and the number of video pictures reproduced is (M). This allows reproduction of film recorded at twenty-four frames per second (n=24) in accordance with U.S. TV standard. No need to repeat picture information at expense of playing time.

European Application Pat. No. 152,141 which also purports to teach that for each film frame recorded only two consecutive fields are recorded and during read-out the scanning point is moved backwards and/or forwards to a preceding and a following turn of a track, respectively in conformity with a predetermined pattern, which turn is situated at a distance corresponding to at least the radial displacement over one revolution in such a way that each time consecutive film frames are reproduced as consecutive sets of at least two fields corresponding to the same film frame, the number of film frames reproduced per unit of time being the specific number n and the number of video pictures reproduced being m.

In particular in the above situation of a film comprising twenty-four frames per second and a television standard of thirty pictures per second, the invention may be characterized further in that n=24 and m=30 and said pattern is such that for every cycle of four film frames two sets of two fields belonging to a different film frame and two sets of three fields belonging to a different film frame are reproduced by reproducing two of the eight recorded fields belonging to said four film frames twice every cycle in conformity with said pattern.

In another embodiment this system is characterized further in that in said cycle of four film frames, corresponding to ten reproduced fields, a backward jump over two fields is effected after every fourth and every sixth field and a forward jump over two fields is effected after every fifth field;

U.S. Pat. No. 3,366,733 purports to teach a system for recording video signals derived from a motion picture film on a disk. The motion picture advance is controlled in synchronism with the rotation of the disk whereby, for example, succeeding film pictures are recorded alternating as two and three fields for twenty-four frames per second type film, or three film pictures are recorded in four fields, one film picture in three fields, in alternating sequence for a sixteen frames per second type film. General rules are developed for the various cases. The recording of sequential fields is controlled in synchronism with the rotation of the disk and the alternating recording patterns are counted out; and Canadian Letters Pat. No. 953,815 which purports to teach a method of converting television video signals representing colour information to colour motion picture film. The video information occurring at sixty fields per second is recorded as a three colour black and white separation master at seventy-two frames per second. Each group of three colours on the black and white separation master is printed as one colour film frame to produce the twenty-four frames per second colour film. Each of the three colours on each colour film frame comes from the same point in time in that it comes from the same TV field and problems of colour fringing are thereby eliminated. In addition, problems of motion irregularity are purported to be eliminated in that the conversion from the sixty field per second television signals to the twenty-four frames per second colour film does not involve the double use of particular ones of the colour groups on the black and white separation master. The conversion is purported to occur because seventy-two separation colour successive frames are recorded on the black and white separation master during the time of sixty colour television fields, and there is no motion irregularity since there is no double use of information.

See also U.S. Pat. No. 4,157,570 and European Application Pat. No. 152,141.

U.S. Pat. No. 4,157,570 purports to teach a TV-cine conversion projector adapted to carry out the ordinary film projection of the projector at the feeding rate of the film frames of substantially twenty-four frames/second and eighteen frames/second, while, in co-operation with a TV camera tube such as a vidicon, it can convert the projected images of the film at the feeding rate of the film frames of substantially twenty-four frames/-second and 18 frames/second into TV pictures scanned at the scanning rate of sixty fields/second or fifty fields/second, and comprises a main shaft driven at a constant speed.

The proposals discussed above suffer from a number of difficiencies. Some reduce the information content during the transfer process from one medium to the other. Some of the systems introduce interfield motion making the processing of the video tape difficult. For example, in colouring of film so transferred, colour spills over from one part of a picture (for example, a hand) to another (for example, a pocket) due to interfield motion.

Still further, and referring to the non-real time playback referred to in the article "Black and White in Colour" in *The BKSTS Journal*, Nov. 1983, the proposal is deficient. Use of the "Slo'Mo" (slow motion) mode of the video tape recorder causes line interpolation to fill in missing information and causes vertical registration inaccuracies and abnormalities. Furthermore, the horizontal resolution is dramatically reduced.

It is therefore an object of this invention to provide an improved process of transferring film to video or film which has been previously transferred to video for the treatment thereof and after treatment converting to a real time play rate, thereby providing a superior product to those preceding Applicant's invention.

Further and other objects of the invention will be realized by those skilled in the art from the following summary of the invention and detailed description of an embodiment thereof.

SUMMARY OF INVENTION

According to one aspect of the invention an improved process of transferring film images to video or conversion of video containing images from film previously transferred to video for the treatment (affecting) thereof and the transfer of recording thereof to a master recording at a real time rate is provided, the process comprising the steps of:

(a) transferring film images to video or transferring or recording video carrying the film images previously transferred or recorded to it to video in a 1:1 frame of film images to frame of video ratio where one frame of film, or one frame of film previously transferred to video as the case may be, corresponds to one frame (two sequential fields) of video—(thus each frame of film now occupies only two sequential fields of video)

(b) treating the said video (affecting the film images on the video);

(c) transferring the video to a master recording suitable for play at a real time rate by simulating the 3:2 pull down by transferring (recording) the fields of the video to the fields of the master in the following sequence, either:

(i) two fields of the video deposited (recorded) on two fields of the master, then the next two fields of the video deposited (recorded) on the next three fields of the master, then the next two fields of the video deposited (recorded) on the next two fields of the master, then the next two fields of the video on the next three fields of the master and so on; or (ii) two fields of the video deposited (recorded) on three fields of the master, then the next two fields of the video deposited (recorded) on the next two fields of the master, then the next two fields of the video deposited (recorded) on the next three fields of the master, then the next two fields of the video deposited (recorded) on the next two fields of the master and so on; maintaining throughout the 3:2 "pull-down" the same sequence of transfer.

According to another aspect of the invention, an improved process of transferring film images to video for the treatment (affecting) thereof and the transfer thereof to a master at a real time rate is provided, the process comprising the steps of:

(a) transferring film images to video in a 1:1 frame of film images to frame of video ratio where one frame of film corresponds to one frame (two sequential fields) of video;

(b) treating said video (affecting the film images on the video);

(c) transferring the video to a master recording suitable for play at a real time rate by simulating the 3:2 pull down by transferring (recording) the fields of the video to the fields of the master in the following sequence, either:

(i) two fields of the video deposited (recorded) on two fields of the master, then the next two fields of the video deposited (recorded) on the next three fields of the master, then the next two fields of the video deposited (recorded) on the next two fields of the master, then the next two fields of the video on the next three fields of the master and so on; or (ii) two fields of the video deposited (recorded) on three fields of the master, then the next two fields of the video deposited (recorded) on the next two fields of the master, then the next two fields of the video deposited (recorded) on the next three fields of the master, then the next two fields of the video deposited (recorded) on the next two fields of the master and so on; maintaining throughout the 3:2 "pull-down" the same sequence of transfer.

According to another aspect of the invention, an improved process of transferring (conversion of video containing images from) film previously transferred to video for the treatment (affecting) thereof and the transfer (recording) thereof to a master (recording) at a real time play rate is provided, the process comprising the steps of:

(a) transferring (recording) video carrying the film images previously transferred (recorded) to it to video in a 1:1 frame of film images to frame of video ratio where one frame of film previously transferred to video corresponds to one frame (two sequential fields) of video;

(b) treating the said video (affecting the film images on the video);

(c) transferring the video to a master recording suitable for play at a real time rate by simulating the 3:2 pull down by transferring the fields of the video to the fields of the master in the following sequence, either:
  (i) two fields of the video deposited recorded on two fields of the master, then the next two fields of the video deposited (recorded) on the next three fields of the master, then the next two fields of the video deposited (recorded) on the next two fields of the master, then the next two fields of the video on the next three fields of the master and so on; or
  (ii) two fields of the video deposited (recorded) on three fields of the master, then the next two fields of the video deposited (recorded) on the next two fields of the master, then the next two fields of the video deposited (recorded) on the next three fields of the master, then the next two fields of the video deposited (recorded) on the next two fields of the master and so on; maintaining throughout the 3:2 "pull-down" the same sequence of transfer.

According to another aspect of the invention, the treatment may comprise automated electronic colouring, special electronic effects, electronic rotoscoping, and electronic post production.

Where film has been transferred to video at standard twenty-four frame rate, there are numerous problems encountered in post production. Keys and supers are difficult to put on and off the screen on screen cuts. Edits are also difficult if they are to happen on specific frames. Electronic Rotoscoping and electronic post effects also can become a problem. These problems occur if the electronic change or occurrence occurs on a picture or film frame that ends, or begins, during a TV frame. The instance of this occuring is twice every five (5) TV frames, or four (4) film frames.

Any film that is to use extensive electronic effects, done in Post Production video should be shot and transferred at thirty (30) frames per second. This allows each film frame to occupy only one TV frame and the post production is vastly simplified.

Transfers to Video Disk could be improved as well as the still frame mode of the disk can cause picture unsteadiness and blurring on inter-field motion. Thirty (30) frame film transfer would eliminate this, if still frames are required.

In some cases, the thirty (30) frame film shoot is not available i.e. the film is already shot at twenty-four (24) or it is available only on video, from a twenty-four (24) frame transfer. This can still be dealt with. If the film is available then it need only be transferred at thirty (30) frames then converted back to twenty-four (24) through the single step recording technique as previously described. This will correct for the increase in speed in Motion and Voice from the thirty (30) frame transfer. (It should be noted that a twenty-four (24) frame transfer must also be done just to get the sound track at the correct speed and to use as a reference in order to sync the final product.)

The case of the film transfer that is only available as a twenty-four (24) frame transfer to video, poses a different problem. It must be single stepped at field rate to make a two (2) field recording master. This removes the third (3rd) field from the 3–2 fields per picture obtained in the original transfer. Then the new master is equivalent to a thirty (30) frame master and can be treated as such, then re-converted back to twenty-four (24) frames in the same sequence as the original.

For technical reasons it is preferable that in all instances, the transfer of "A" fields be to "A" fields of video and "B" fields to "B" fields to eliminate colour framing errors.

According to another aspect of the invention, a system is provided for transferring film images to video or conversion of video containing images from film previously transferred to video and the subsequent transfer thereof to a master recording at a real time rate, the system comprising:

(a) means for transferring film images to video or transferring (recording) video carrying the film image previously transferred (recorded) to it, to video in a 1:1 frame of film images to frame of video ratio where one frame of film or one frame of film previously transferred to video, corresponds to one frame (two sequential fields) of video - thus each frame of film now occupies only two sequential fields of video; and (b) means for transferring the video to a master recording suitable for play at a real time rate by simulating the 3:2 pull down by transferring (recording) the fields of the video to the fields of the master in the following sequence, either:
  (i) two fields of the video deposited (recorded) on two fields of the master, then the next two fields of the video deposited (recorded) on the next three fields of the master, then the next two fields of the video deposited (recorded) on the next two fields of the master, then the next two fields of the video on the next three fields of the master and so on; or
  (ii) two fields of the video deposited (recorded) on three fields of the master, then the next two fields of the video deposited (recorded) on the next two fields of the master, then the next two fields of the video deposited (recorded) on the next three fields of the mastet, then the next two fields of the video deposited (recorded) on the next two fields of the master and so on; maintaining throughout the 3:2 "pull-down" the same sequence of transfer.

According to a preferred embodiment, the above system comprises (where it is desired to transfer film to video):

(a) a telecine (preferably not a photoconductive telecine) for use to convert film images into video signals at a sped-up rate of thirty (30) frames/second;

(b) a video tape recorder for receiving the video signals from the telecine and recording them on tape in 1:1 frame of film images to frame of video ratio where one frame of film corresponds to one frame (two sequential fields) of video;

(c) Digital Disk Recorder for transferring the video stored at the increased velocity to a video tape recorder for recordal on a master tape at a real time rate; and (d) circuitry (for example, counter software or circuitry and interface circuitry) connected to the Digital Disk Recorder and the video tape recorder for facilitating the simulation of the 3:2 pull down by transferring the fields of the video stored at the increased velocity to the fields of the master tape.

According to another aspect of the invention, a video tape is provided prepared by a process previously described.

BRIEF DESCRIPTION OF DRAWINGS

FIG. 1 is a schematic illustrating the implementation of the process according to an embodiment of the invention.

FIG. 2 is a plan view of the transport of the telecine used in the process illustrated in FIG. 1.

FIG. 3 is a block schematic illustrating the structure of one of the components shown in FIG. 1.

FIGS. 4 and 5 (found with FIG. 1) illustrate the transfer of modified video to standard real time video.

FIG. 6 is a block diagram of the Digital Disk Recorder/Playback.

DESCRIPTION OF EMBODIMENTS

With reference to FIG. 1, there is shown Rank Cintel Mark III Flying Spot Dual Guage Multistandard Telecine 10 (not a photoconductive telecine) which telecine is used to convert film 12 (depicted generally at 12A) loaded on spool 13 to video signals for transmission along cable 14 to Sony VTR (Video Tape Recorder) 16 Model BVH2500 and storage on tape 18 (depicted generally as 18A).

With reference to FIGS. 1 and 2, film 12 leaving feed spool 13 passes over three dual guage rollers 20,22 and 24, two fixed (20 and 24) and the third 22 being a tension arm roller controlling the feed spool servo (not shown). The film then enters the vision gate and in the case of 16 mm film, passes directly to the capstan 26 and vision gate 27 after which it enters the take-up tension roller system comprising two fixed rollers 30 and 34 and tension arm roller 32 before final take up at spool 36. The 35 mm path has one extra roller.

The optics of telecine 10 consist of a flying spot cathode ray tube, a single objective lens in vision gate 27 for each format and a light collecting and colour splitting photocell box, behind the film.

The continuously moving film is scanned in opposite direction to the film motion during each active field. Because film 12 is to be transferred to video in a 1:1 frame of film images to frame of video ratio where 1 frame of film corresponds to one frame (two sequential fields) of video, capstan drive 26 is driven faster at the appropriate speed up velocity (at the thirty (30) frame/second rate as opposed to the twenty-four (24) frame per second rate) to so lay down the frames of film on video to have the 1:1 correspondency.

The film motion is controlled by two separate spooling servos and a capstan servo. Each spooling servo operates by means of feedback from the tension roller, and merely controls the film tension whereas the capstan alone controls the film velocity.

Each tension roller is coupled to a shutter which varies the light collected by a photocell. The photocell amplifier drives the spooling motor amplifier, the d.c. spooling motor being coupled directly to the film spool shaft. A high degree feedback is employed, to obtain extremely constant film tension even when using non-concentric or damaged film spools. The spooling servos are capable of providing torque in either direction in forward or reverse so that for rapid starts the initial torque on the feed spool can be reversed to start full spools.

The capstan servo's main aim is to transport the film at the constant velocity, and this is done by using a primary velocity feedback loop with a high degree of feedback, and minimum lag. It is also necessary to phase lock the film to the station syncs., and for this purpose a secondary feedback loop with integration is used.

The video signal corresponding to a rate of thirty (30) frames of film per second is forwarded along cable 14 to VTR 16—Sony Model BVH 2500— where each frame of film is laid onto one frame (two fields) of video on tape 18.

VTR 16 provides the operational features and functions of the most modern C Format VTR's with the additional flexibility of a variable speed record mode; Δt recording. Δt is a highly refined form of time lapse recording. A number of record speeds are available from real time, when the BVH-2500 behaves as a standard C Format recorder, to still frame. A C Format 'footprint' is maintained on tape at all times, ensuring compatibility with other C Format VT's. In the still frame record mode, the recording is sequential, requiring no pre-roll, forward/backward motion, or re-synchronisation. A single 11.75" diameter reel of tape provides storage for up to 200,000 frames, or if required, up to 400,000 fields.

Both serial and parallel control ports provide convenient interfacing with external control systems. Large quantities of 'stills' may be simply edited and organized, using existing systems and techniques, and with the quality inherent in C Format recorders. Other important applications of the BVH-2500 Δt VTR, include computer graphics, animation, video disc mastering and time lapse recording.

In the real time non-Δt mode, all standard editing and control functions are available. Δt operation is provided in three operational modes. All modes require that the master tape be prepared with control track information; normally Black Burst. One mode is still recording. A single field or frame may be recorded by selection of 'Still' and then Edit/Record commands. A minimum time of 0.2 sec per field or frame is required for the erase/write sequence and the record made in use is displayed on the control panel display.

After the video signal transferred by cable 14 to VTR 16 for recordal on tape 18 at 30 frames/second [1:1 ratio of frame of film images to frame of video] and the signal has been recorded, the tape is then treated. See for example, those treatments outlined in FIG. 1.

Thereafter, the tape is ready for return to "real time". In this regard, the video is input along cable 50 into Digital Disk Recorder/Playback 52 Model Abekas A62 manufactured by Video Systems, Inc. (see FIG. 6)

Digital Disk Recorder/Playback 52 combines the well known advantages of digital video recording with high-speed Winchester disk drives, producing a precisely controllable real-time record and playback device offering a full range of record/playback speeds from "still" frame to up to thirty times in forward and reverse.

Digital Disk Recorder/Playback 52 is capable of play-record of 3,000 frames or 6,000 fields of video. It does not use tape and works in digital video domain so internal dubbing does not cause generation loss and still frame or play passes do not wear out or damage the recording. Thus, the Digital Disk Recorder 52 records the video on disk on the two Winchester computer Disk Drives at thirty frames/second in video format (transferred over cable 50 after treatment of tape 18).

Thereafter, using the "MACRO" programmable keystrokes of the Digital Disk Recorder Playback 52 and the counter circuitry shown in FIG. 3, the "video" is returned to "real time".

In this regard, the video signals are caused to be laid down on video tape 60 carried on VTR 62 Sony Model BVH-2500 (identical to VTR 16) by simulating 3:2 pull down by transferring the fields of the video to the fields of tape 60 in the following sequence, either:

(i) two fields of the video deposited (recorded) on two fields of the master, then the next two fields of the video deposited (recorded) on the next three fields of the master, then the next two fields of the video deposited (recorded) on the next two fields of the master, then the next two fields of the video on the next three fields of the master and so on; or (ii) two fields of the video deposited (recorded) on three fields of the master, then the next two fields of the video deposited (recorded) on the next two fields of the master then the next two fields of the video deposited (recorded) on the next three fields of the master, then the next two fields of the video deposited (recorded) on the next two fields of the master and so on; maintaining throughout the 3:2 "pull-down" the same sequence of transfer.

Thus with respect to subparagraph (i) and referring to FIG. 4, the Digital Disk Recorder/Playback and circuitry combination lays down (a) the two fields (A,B) stored in the Playback 52, (b) then the next two fields (A,B) additionally laying down in this case the first field (A) of such two fields (A,B) for one field (A) for a total of three fields, (c) then the two fields (A,B) in fields (B,A), (d) then the two fields (A,B) in (B,A) and additionally laying down in this case the second (B) of such two fields for a total of three fields (A,B,A), and so on. Thus with respect to FIG. 4, the Fields from tape 16 inputted to Abekas Digital Disk Recorder/Playback 52, is caused to be laid down in sequence as shown to return the movies to "real time".

With respect to subparagraph (ii), reference should be had to FIG. 5. In this laydown, three fields are first laid down on tape 60 from two fields (A,B) stored in Digital Disk Recorder 52 representing one frame of film. Two fields (B,A) are then deposited on tape 60 corresponding to fields A,B; then three fields, and so on.

To facilitate the "pull down", cable 70 connects Digital Disk Recorder/Playback 52 to VTR 62, and the circuitry shown in FIG. 3 is secured to both Playback 52 and VTR 62. Circuitry 72 is shown in box 74 shown in FIG. 1. The circuitry in box 74 may comprise counter software or circuitry and interface circuitry. Circuitry 72 is connected by cable 76 to VTR 62 and cable 78 to Recorder/Playback 52. NTSC Synchronizer Generator 80 is used to synchronize the release of frame pulses. NTSC Synchronizer Generator 80 is located remotely and is used to synchronize all sources in the installation (for television installation).

For the purposes of simulating 3:2 pull down, synchronizer 80 releases synchronizing pulses which rate of pulses is divided by divider 82 to slow down their rate. The two counters 90 and 92, depending on which switch 84A or 84B is closed, counts the synchronization pulses transmitted from synchronizer 80, permitting the requisite number of pulses to pass through the counter (either 2 or 3) to cause the VTR 62 to record a field per pulse, each field transmitted by the Abekas Digital Disk Recorder/Playback 52. After the requisite number of pulses has been transmitted (with respect to FIG. 3, 2 pulses) and the two fields laid down—(see FIG. 4), the counter 90 is reset, the switch 84A is opened and switch 84B is closed. The Abekas Digital Disk Recorder/Playback 52 is then advanced one frame and the process continued. Since two pulses have previously been transmitted, counter 92 now counts 3 pulses laying down three fields before the Abekas Digital Disk Recorder/Playback 52 is next advanced one frame (see FIG. 4). Thus simulation of a 3:2 pull down is accomplished whereby two fields then three fields, then two fields then three fields respectively are laid down on video tape 60 returning the "movie" or "film" to "real time". Thus a master tape 60 is prepared in "real time" of the treated tape 18.

As many changes can be made to the embodiment without departing from the scope of the invention, it is intended that all matter contained herein be interpreted as illustrative of the invention and not in a limiting sense.

The embodiments of the invention in which an exclusive property or privilege is claimed are as follows:

1. An improved process of transferring film images to video or conversion of video containing images from film previously transferred to video for the affecting thereof and the recording thereof to a master recording at a real time rate, the process comprising the steps of:
  (a) transferring film images to video or recording video carrying the film images previously recorded to it to video in a 1:1 frame of film images to frame of video ratio where one frame of film, or one frame of film previously transferred to video as the case may be, corresponds to one frame of video;
  (b) affecting the film images on the video;
  (c) transferring the video to a master recording suitable for play at a real time rate by simulating the 3:2 pull down by recording the fields of the video to the fields of the master in the following sequence, either:
    (i) two fields of the video recorded on two fields of the master, then the next two fields of the video recorded on the next three fields of the master, then the next two fields of the video recorded on the next two fields of the master, then the next two fields of the video on the next three fields of the master and so on; or
    (ii) two fields of the video recorded on three fields of the master, then the next two fields of the video recorded on the next two fields of the master, then the next two fields of the video recorded on the next three fields of the master, then the next two fields of the video recorded on the next two fields of the master and so on; maintaining throughout the 3:2 "pull-down" the same sequence of transfer.

2. An improved process of transferring file images to video for the treatment affecting thereof and the recorded thereof to a master recording at a real time rate, the process comprising the steps of:
  (a) transferring film images to video in a 1:1 frame of film images to frame of video ratio where one frame of film corresponds to one frame (two sequential fields) of video;
  (b) affecting the film images on the video;
  (c) transferring the video to a master recording suitable for play at a real time rate by simulating the 3:2 pull down by recording the fields of the video to the fields of the master in the following sequence, either:

(i) two fields of the video recorded on two fields of the master, then the next two fields of the video recorded on the next three fields of the master, then the next two fields of the video recorded on the next two fields of the master, then the next two fields of the video on the next three fields of the master and so on; or (ii) two fields of the video recorded on three fields of the master, then the next two fields of the video recorded on the next two fields of the master, then the next two fields of the video recorded on the next three fields of the master, then the next two fields of the video recorded on the next two fields of the master and so on; maintaining throughout the 3:2 "pull-down" the same sequence of transfer.

3. An improved process of conversion of video containing images from film previously transferred to video for the affecting thereof and the recording thereof to a master recording at a real time rate, the process comprising the steps of:

(a) recording video carrying the film images previously recorded to it to video in a 1:1 frame film images to frame of video ratio where one frame of film previously transferred to video corresponds to one frame of video;

(b) affecting the film images on the video;

(c) transferring the video to a master recording suitable for play at a real time rate by simulating the 3:2 pull down by recording the fields of the video to the fields of the master in the following sequence, either:

(i) two fields of the video recorded on two fields of the master, then the next two fields of the video recorded on the next three fields of the master, then the next two fields of the video recorded on the next two fields of the master, then the next two fields of the video on the next three fields of the master and so on: or (ii) two fields of the video recorded on three fields of the master, then the next two fields of the video recorded on the next two fields of the master, then the next two fields of the video recorded on the next three fields of the master, then the next two fields of the video recorded on the next two fields of the master and so on; maintaining throughout the 3:2 "pull-down" the same sequence of transfer.

4. The process of claim 1, 2 or 3, wherein the treatment may comprise automated electronic colouring, special electronic effects, electronic rotoscoping, and electronic post production.

5. A system for transferring film images to video or conversion of video containing images from film previously transferred to video and the subsequent transfer thereof to a master recording at a real time rate, the system comprising:

(a) means for transferring film images to video or recording video carrying the film images previously recorded to it, to video in a 1:1 frame of film images to frame of video ratio where one frame of film or one frame of film previously transferred to video, corresponds to one frame of video and (b) means for transferring the video to a master recording suitable for play at a real time rate by simulating the 3:2 pull down by recording the fields of the video to the fields of the master in the following sequence, either:

(i) two fields of the video recorded on two fields of the master, then the next two fields of the video recorded on the next three fields of the master, then the next two fields of the video recorded on the next two fields of the master, then the next two fields of the video on the next three fields of the master and so on; or (ii) two fields of the video recorded on three fields of the master, then the next two fields of the video recorded on the next two fields of the master, then the next two fields of the video recorded on the next three fields of the master, then the next two fields of the video recorded on the next two fields of the master and so on; maintaining throughout the "pull-down" the same sequence of transfer.

6. A system for transferring file to images video and the subsequent transfer to a master recording to be played at a real time rate, the system comprising:

(a) means for transferring film images to video in a 1:1 frame of film images to frame of video ratio where one frame of film corresponds to one frame of video; and (b) means for transferring the video to a master recording suitable for play at a real time rate by simulating the 3:2 pull down by recording the fields of the video on the fields of the master in the following sequence, either:

(i) two fields of the video recorded on two fields of the master, then the next two fields of the video recorded on the next three fields of the master, then the next two fields of the video recorded on the next two fields of the master, then the next two fields of the video on the next three fields of the master and so on: or (ii) two fields of the video recorded on three fields of the master, then the next two fields of the video recorded on the next two fields of the master, then the next two fields of the video recorded on the next three fields of the master, then the next two fields of the video recorded on the next fields of the master and so on; maintaining throughout the 3:2 "pull-down" the same sequence of transfer.

7. A system for transferring film to video and the subsequent transfer thereof to a master at a real time rate, the system comprising:

(a) a telecine for use to convert film images into film video signals at a sped-up rate of thirty (30) frames/second;

(b) a video tape recorder for receiving the video signals from the telecine and recording them on tape in 1:1 frame of film images to frame of video ratio wherein one frame of film corresponds to one frame of video;

(c) Digital Disk Recorder for transferring the video stored at the increased velocity to a video tape recorder for recordal on a master tape at a real time rate; and (d) circuitry connected to the Digital Disk Recorder and the video tape recorder for facilitating the simulation of the 3:2 pull down by transferring the fields of the video stored at the increased velocity to the fields of the master tape.

8. The system of claim 7 wherein said circuitry connected to the Digital Disk Recorder comprises counter software of circuitry and interface circuitry.

* * * * *